(12) United States Patent
Vembu et al.

(10) Patent No.: US 9,100,693 B2
(45) Date of Patent: Aug. 4, 2015

(54) METHODS AND APPARATUSES FOR SECURING PLAYBACK CONTENT

(75) Inventors: Balaji Vembu, Folsom, CA (US); Suryaprasad Kareenahalli, Folsom, CA (US); Daniel Nemiroff, Folsom, CA (US); Zohar Bogin, Folsom, CA (US); Raul Gutierrez, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 233 days.

(21) Appl. No.: 12/796,502

(22) Filed: Jun. 8, 2010

(65) Prior Publication Data
US 2011/0299680 A1 Dec. 8, 2011

(51) Int. Cl.
H04L 29/06 (2006.01)
H04N 21/4405 (2011.01)
H04N 21/426 (2011.01)
H04N 21/4408 (2011.01)
G06F 21/10 (2013.01)

(52) U.S. Cl.
CPC ............ *H04N 21/4405* (2013.01); *G06F 21/10* (2013.01); *H04N 21/42623* (2013.01); *H04N 21/4408* (2013.01)

(58) Field of Classification Search
CPC .......... H04N 21/4181; H04N 21/4405; H04N 21/4623; H04N 21/4408; G06F 21/10; G06F 2221/0797
USPC ............... 380/200; 713/150; 725/25; 705/51; 375/240
See application file for complete search history.

(56) References Cited

U.S. PATENT DOCUMENTS

| | | |
|---|---|---|
| 2001/0016836 A1* | 8/2001 | Boccon-Gibod et al. ........ 705/51 |
| 2002/0164022 A1 | 11/2002 | Strasser et al. |
| 2004/0109563 A1 | 6/2004 | Evans et al. |
| 2004/0181800 A1* | 9/2004 | Rakib et al. ..................... 725/25 |
| 2005/0265547 A1 | 12/2005 | Strasser et al. |
| 2005/0283602 A1* | 12/2005 | Vembu et al. .................. 713/150 |
| 2007/0100701 A1 | 5/2007 | Boccon-Gibod et al. |
| 2007/0297501 A1* | 12/2007 | Hussain et al. ............... 375/240 |
| 2008/0291999 A1 | 11/2008 | Lerouge et al. |
| 2009/0097659 A1 | 4/2009 | Candelore |
| 2009/0172331 A1 | 7/2009 | Vembu et al. |
| 2009/0245521 A1 | 10/2009 | Vembu et al. |
| 2009/0259857 A1 | 10/2009 | Gehrmann |

(Continued)

OTHER PUBLICATIONS

Wiegand, T.; Sullivan, G.J.; Bjontegaard, G.; Luthra, A.;, "Overview of the H.264/AVC video coding standard," Circuits and Systems for Video Technology, IEEE Transactions on , vol. 13, No. 7, pp. 560-576, Jul. 2003.*

(Continued)

*Primary Examiner* — S. Ali Zaidi
(74) *Attorney, Agent, or Firm* — Blakely, Sokoloff, Taylor & Zafman LLP (57) ABSTRACT

An apparatus for secured playback is presented. In one embodiment, the apparatus includes a controller that includes a key derivation module to manage authentication and key derivation. In one embodiment, the apparatus provides a video decryption key to a graphics engine if video data portions in a data stream are retrievable without having to decrypt the data stream. In one embodiment, the apparatus also includes a decryption module to decrypt a part of data in conjunction with an encryption key to generate video information and video data. The controller then writes an encrypted version of the video data to a video buffer of a graphics engine.

19 Claims, 4 Drawing Sheets

(56) References Cited

U.S. PATENT DOCUMENTS

| | | |
|---|---|---|
| 2010/0002875 A1 | 1/2010 | Li |
| 2010/0020968 A1* | 1/2010 | Jin et al. .................. 380/200 |
| 2010/0172630 A1* | 7/2010 | Chou et al. ................ 386/94 |

OTHER PUBLICATIONS

Int'l Search Report and Written Opinion for Int'l Patent Application No. PCT/US2011/035412 mailed Dec. 26, 2011, 9 pgs.

Office Action & Search Report for Taiwan Patent Application No. 100115971 dated Apr. 15, 2014, 18 pages.

Extended European Search Report for European Patent Application No. 11792835.8 dated Oct. 29, 2013, 7 pages.

International Preliminary Report on Patentability for PCT/US2011/035412 mailed Dec. 20, 2012, 6 pages.

Office Action for European Patent Application No. 11792835.8 dated Aug. 25, 2014, 4 pages.

Notice of Allowance for Taiwan Patent Application No. 100115971 dated Feb. 16, 2015, 3 pages.

* cited by examiner

METHODS AND APPARATUSES FOR SECURING PLAYBACK CONTENT

FIELD OF THE INVENTION

Embodiments of the invention relate to the data protection of a computing system. More particularly, embodiments of the invention relate to a computing system with video processing.

BACKGROUND OF THE INVENTION

Various types of secure content may be received to be played back on a computer. For example, pay per view video or proprietary content may be received on a computer system for playback. Digital versatile disc (DVD) content may also be played on computers. The content may arrive in an encrypted manner and, therefore, cannot be easily intercepted in the route to the receiving computer.

Newer content protection schemes like the Advanced Access Content System (AACS) is a standard for content distribution and digital rights management, intended to restrict access to and copying of optical discs and DVDs. See "Advanced Access Content System: Introduction and Common Cryptographic Elements" Rev 0.91 or Rev 0.951. The standard has been adopted as the access restriction scheme for HD DVD and Blu-ray Disc (BD).

However, once the content arrives at the computer, it may be decrypted for playback. Licensed players use a DRM (digital rights management) device key for extracting a title key which is then used for decrypting the media content. Typically, DRM device keys are protected using Tamper Resistant Software methods which have been historically broken often thus exposing the device keys for use by unlicensed players for unauthorized content ripping. Once decrypted, it may be accessed by malevolent software on the computer system and stolen by unauthorized entities. Unauthorized copies of software, DVD discs, games, videos, and other content may be made in this way.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

An apparatus for secured playback is presented. In one embodiment, the secured playback is performed in conjunction with an Open PC platform. In one embodiment, the apparatus includes a controller that includes a key derivation module to manage authentication and key derivation.

In one embodiment, if a graphics engine on a system is capable of processing video data natively (e.g., if video data portions are identifiable in a data stream without having to decrypt the data stream), the key derivation module provides a content decryption key to the graphics engine via a secured channel. In another embodiment, if the graphics engine does not process video data natively (e.g., video data portions and audio data portions are interleaved in a data stream in such a manner that the data stream is to be decrypted in order to de-multiplex the video and audio data portions), the apparatus includes a decryption module to decrypt a part of data in conjunction with an encryption key to generate video information and video data. The controller then writes an encrypted version of the video data to a video buffer of the graphics engine.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general purpose computer selectively activated or reconfigured by a computer program stored in the computer. Such a computer program may be stored in a computer readable storage medium, such as, but not limited to, any type of disc including floppy disks, optical discs, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for secure playback systems. Specifically, secure playback systems are primarily discussed in reference to multi-core processor computer systems. However, the methods and apparatus for secure playback systems are not so limited, as they may be implemented on or in association with any integrated circuit device or system, such as cell phones, personal digital assistants, embedded controllers, mobile platforms, desktop platforms, and server platforms, as well as in conjunction with other resources, such as hardware/software threads.

Overview

An apparatus for secured playback is presented. In one embodiment, the secured playback is performed in conjunction with an Open PC platform. In one embodiment, the apparatus includes a controller that includes a key derivation module to manage authentication and key derivation.

In one embodiment, if a graphics engine on a system is capable of processing video data natively (e.g., if video data portions are identifiable in a data stream without having to decrypt the data stream), the key derivation module provides a content decryption key to the graphics engine via a secured channel. In another embodiment, if the graphics engine does not process video data natively (e.g., video data portions and audio data portions are interleaved in a data stream in such a manner that the data stream is to be decrypted in order to de-multiplex the video and audio data portions), the apparatus includes a decryption module to decrypt a part of data in conjunction with an encryption key to generate video information and video data. The controller then writes an encrypted version of the video data to a video buffer of the graphics engine.

Figure 1:
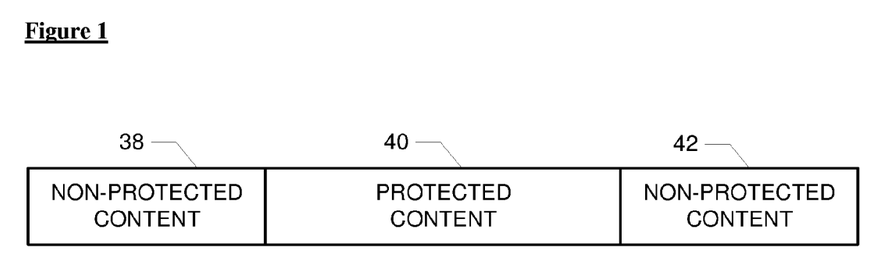
FIG. 1 is an embodiment of video and audio data with protected content.

FIG. 1 is an embodiment of video and audio data with protected content. Referring to FIG. 1, in one embodiment, audio/video data (or other type of data) from storage are divided into two categories: protected content 40 and non-protected content 38. Non-protected content 38 is also referred to as less-sensitive data or non-sensitive data. In one embodiment, content from non-protected content 38 is given ordinary protection or relatively low protection. For example, non-protected content 38 is not encrypted.

In one embodiment, data in a file comprise different contents associated with different degree of sensitivity with regards to the data protection. For example, video data which will be processed by a graphics engine for generating video display are sensitive data. On the other hand, audio data are less-sensitive data when compared with the video data.

In one embodiment, protected content 40 is also referred to as sensitive data. The data are protected by encryption. For example, the data are protected during hardware processing such that intermediate buffers storing the data are inaccessible to software running on the computer and to hardware devices other than graphics engine devices.

In one embodiment, high density digital video discs (HD-DVD) require higher protection than standard digital video discs. The HD-DVD discs may contain encrypted content. Media player applications incorporate Advanced Access Content System (AACS) device keys obtained under the license from the AACS licensing administrator that allow the applications to decrypt the content from the discs and then process the content for playback. A title key is derived from storage (e.g., discs) before the content from the storage is capable of being decrypted. In one embodiment, the keys are opaque to media player applications and only accessible to the processing hardware.

In one embodiment, a secure playback system enables secure playback of media content by performing sensitive media processing operations using hardware. Such sensitive processing operations include performing DRM key derivation and extracting a title key which is then used for decrypting the media content. The playback system separates out sensitive and less-sensitive content in the media stream. In one embodiment, the playback system packages the sensitive video content so that it could only be consumed by a graphics engine.

In one embodiment, less-sensitive data include but not limited to navigation data, audio data, control information, non-slice data of video, and video slice headers. The control information includes, for example, sequence headers, sequence scalable extension, picture parameters, and entry point layers. In one embodiment, less-sensitive data include headers (video), audio frames, and navigation frames. The less-sensitive data are provided to a TRS (tamper resistant software) application to allow users to navigate through a movie and to perform audio processing.

In one embodiment, sensitive data include "keys" (e.g., encryption keys) and video data. In one embodiment, the protection to sensitive data is provided by the secure playback system with respect to FIG. 2.

Figure 2:
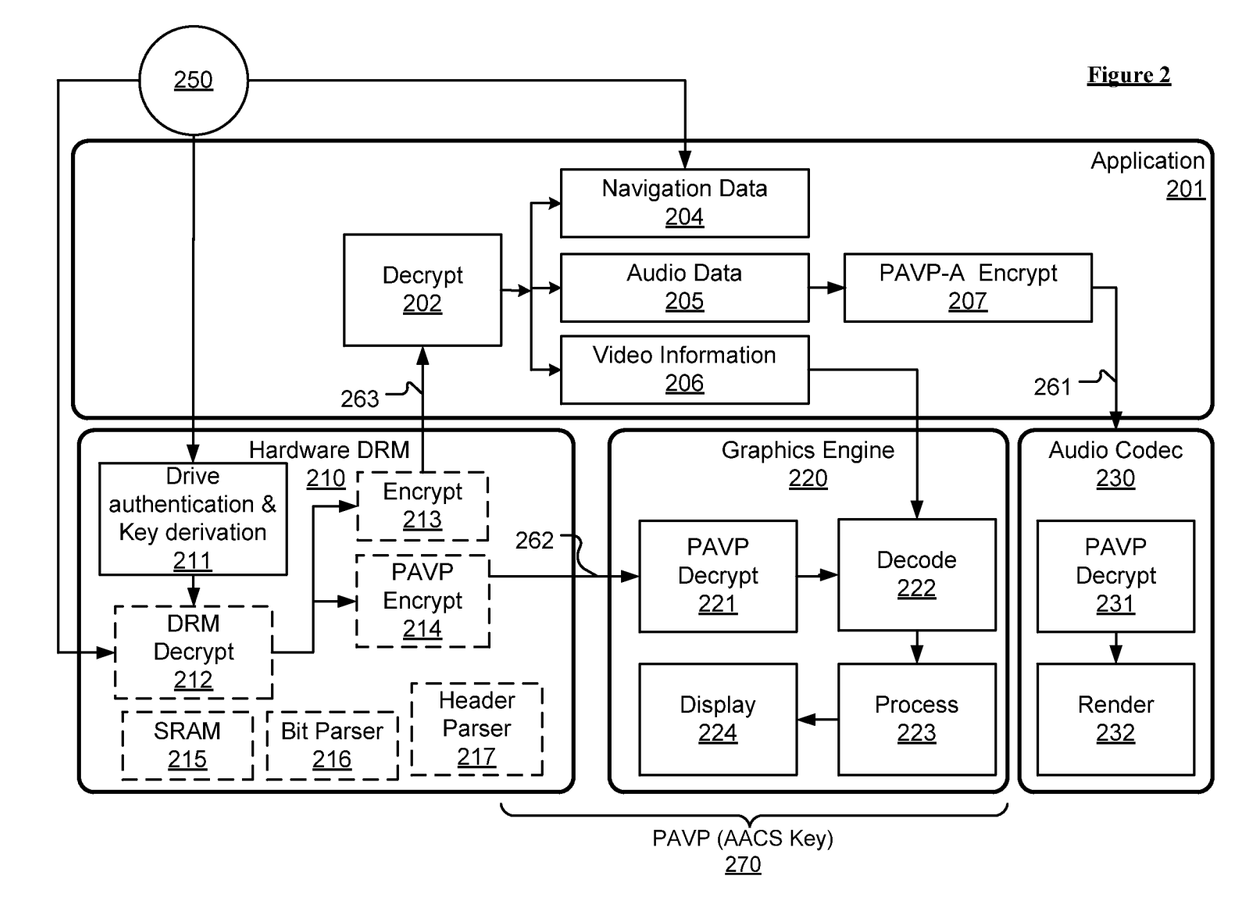
FIG. 2 is a block diagram of a secure playback system in accordance with one embodiment of the invention.

FIG. 2 is a block diagram of a secure playback system in accordance with one embodiment of the invention. Many related components such as buses and peripherals have not been shown to avoid obscuring the invention. Referring to FIG. 2, the secure playback system includes application 201, DRM platform 210, graphics engine 220, and audio codec 230. The secure playback system is coupled to receive data (e.g., audio/video data) from storage 250.

In one embodiment, application 201 includes decryption 202, navigation data 204, audio data 205, video information 206, and PAVP-Audio (Protect Audio Video Path) encryption 207. In one embodiment, DRM platform 210 includes drive authentication & key derivation 211, DRM decryption 212, encryption 213, PAVP encryption 214, SRAM 215, bit parser 216, and header parser 217. In one embodiment, DRM decryption 212, encryption 213, PAVP encryption 214, SRAM 215, bit parser 216, and header parser 217 are optional components in DRM platform 210.

In one embodiment, graphics engine 220 includes PAVP decryption 221, decode 222, process 223, and display 224. In one embodiment, PAVP decryption 221 is coupled to PAVP encryption 214 via interface 262. In one embodiment, audio codec 230 includes PAVP decryption 231 and rendering engine 232. PAVP decryption 231 is coupled to PAVP-A encryption 207 via interface 261. In one embodiment, DRM platform 210 includes embedded microcontrollers.

In one embodiment, application 201 sends content encrypted with DRM keys (e.g., title keys) from a disc to DRM platform 210. Application 201 receives enough data from DRM platform 210 to control the playback process. Application 201 deduces start of a video slice and the length of video slice from its buffer and uses the other less-sensitive content from the buffer. In one embodiment, application 201 is able to access video headers, system information, and slice headers only.

In one embodiment, DRM platform 210 parses a media stream and separates it into two parts: the first part which contains sensitive content (slice data) and the second part which contains less-sensitive content. The sensitive content is encrypted with a key that is only known to the graphics processing hardware. The video data are decrypted by DRM decryption 212 and are encrypted again by PAVP encryption 214 so that the data are then written to graphics engine 220 (or buffers thereof).

In one embodiment, less-sensitive content is passed back to application 201 so that application 201 is able to direct the playback of the video (e.g., movie). The less-sensitive data (e.g., video information 206) include navigational data, video header data (and audio which is considered less sensitive). In one embodiment, encryption 213 encrypts the video information with a key to be shared with application 201.

In one embodiment, DRM platform 210 splits data into portions. One of the portions is visible to application 201 only. Another portion is visible to graphics engine 220 only. This shields application 201 from sensitive video data but still provides enough information to allow application 201 to control the video decoding and playback process. In one embodiment, DRM platform 210 performs encryption and decryption in conjunction with a generic decryption engine provided by a platform controller hub.

In one embodiment, drive authentication & key derivation 211 is a cryptography engine with public-private keys functionality. Drive authentication & key derivation 211 sets up session keys, such as, for example, keys between DRM platform 210 and application 201, keys between DRM platform 210 and graphics engine 220, as well as keys between application 201 and audio codec 230. Drive authentication & key derivation 211 also performs key derivations as required by various media formats.

In one embodiment, an InDMA engine includes drive authentication & key derivation 211. The engine reads content from system memory, decrypts the content, and writes the decrypted content to SRAM 215.

In one embodiment, header parser 217 scans through a data buffer to determine the packet boundaries (e.g., MPEG2 transport headers). Header parser 217 also identifies instructions to parse for determining boundaries between sensitive and less-sensitive data.

In one embodiment, bit parser 216 is a programmable parser that performs bit parsing to determine the offsets where sensitive (or otherwise less-sensitive data) are contained. In one embodiment, bit parser 216 handles different programs that can parse MPEG2, MPEG4 and VC1 video data streams to determine the boundary of slice header and slice data (macroblock data).

In one embodiment, an outDMA engine includes encryption 213 and PAVP encryption 214. The engine creates two output buffers: 1) the buffer for application 201 which contains only less-sensitive data, while the sensitive data are blacked out (e.g., filled with 1s or 0s); and 2) the buffer for graphics engine 220 which is encrypted with a session key shared between DRM platform 210 and graphics engine 220. In one embodiment, the buffer for graphics engine 220 contains sensitive video macro block data. The buffer is not readable (accessible) by application 201. In one embodiment, PAVP 270 covers interface 262 and graphics engine 220 in which sensitive data are protected in conjunction with hardware keys (e.g., AACS keys)

In one embodiment, audio data 205 are encrypted by PAVP-encryption 207 and sent to audio codec 230 via interface 261. In one embodiment, PAVP decryption 231 decrypts the audio data and renders the audio data for playback.

In one embodiment, PAVP decryption 221 (of graphics engine 220) receives encrypted version of video data. PAVP decryption 221 decrypts the video data. Decode 222 decodes the video data. Process 223 performs video processing on the video data before the video data are ready for display 224.

In one embodiment, application 201 performs detection of data type (frame type). The detection is possible without a security key if headers are not encrypted. Sensitive data, if detected, will be propagated to DRM platform 210.

In one embodiment, a system for secure playback may be used in with any kind of encrypted material, including graphics, video, still pictures, text, games, software, or data.

In one embodiment, the encryption and decryption are performed in accordance with Advanced Encryption Standard (AES) developed by the National Institute of Standards and Technology (NIST), Washington, D.C.

Figure 3:
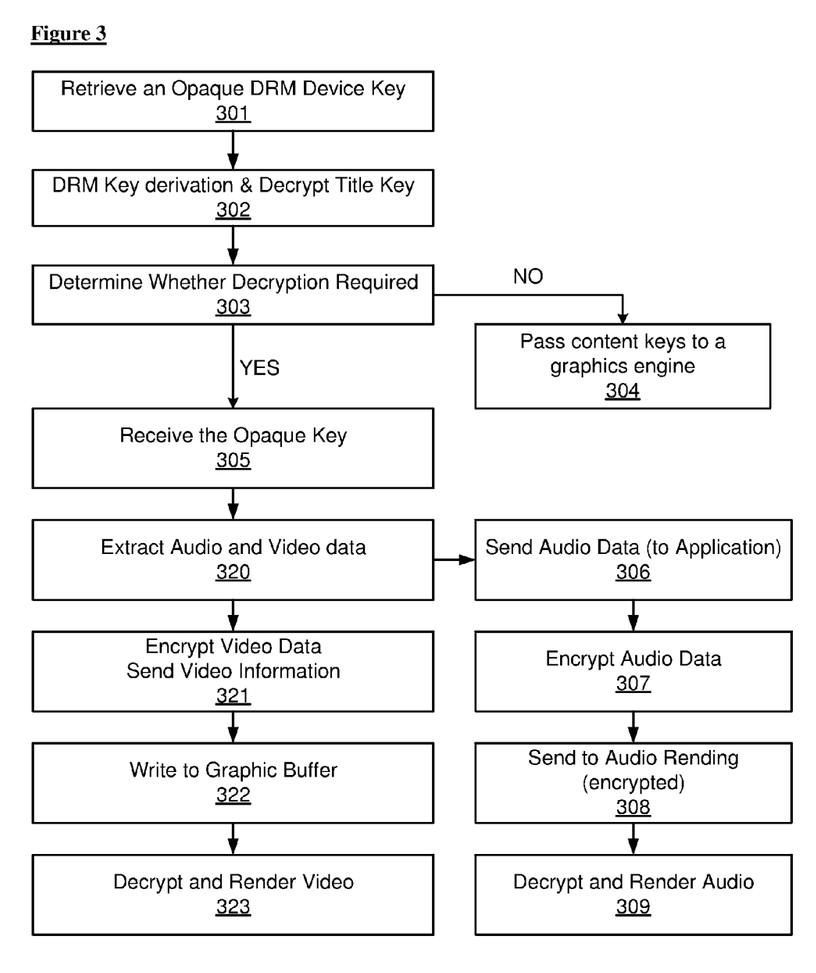
FIG. 3 is a flow diagram of one embodiment of a process for secure playback.

FIG. 3 is a flow diagram of one embodiment of a process for secure playback. The process is performed by processing logic that may comprise hardware (circuitry, dedicated logic, etc.), software (such as one that is run on a general purpose computer system or a dedicated machine), or a combination of both. In one embodiment, the process is performed in conjunction with a secure playback system (e.g., secure playback system with respect to FIG. 2). In one embodiment, the process is performed by a computer system with respect to FIG. 4.

Referring to FIG. 3, in one embodiment, processing logic begin by retrieving an opaque DRM device key (process block 301). The opaque key is a part of a security code inaccessible by a player application.

In one embodiment, processing logic sends DRM wrapped title key (process block 302). Processing logic performs DRM key derivation and extracts (decrypts) a title key. In one embodiment, processing logic determines whether decryption is required to access content in the data (process block 303). In one embodiment, processing logic provides a content decryption key to a graphics engine if decryption is not required (process block 304).

Otherwise, in one embodiment, processing logic receives an opaque key (process block 305). Processing logic receives, in response to execution of an application, the authentication information including a first key. Processing logic performs key derivation in conjunction with the first key and decrypts a part of data to generate video information and video data. In one embodiment, the first key is opaque to the application and an unencrypted version of the video data is protected from the application.

In one embodiment, processing logic extracts Audio/Video data (process block 320). Processing logic sends audio data (to an application) (process block 306). Processing logic encrypts the audio data (process block 307). In one embodiment, the encryption key is shared between an application and an audio engine. Processing logic sends the audio data for audio rendering (process block 308). Processing logic decrypts and renders the audio data (process block 309).

In one embodiment, processing logic encrypts video data (process block 321). In one embodiment, the encryption key is shared between platform hardware and a graphics engine. In one embodiment, processing logic sends video information which includes audio data and video headers to an application (process block 321).

In one embodiment, processing logic writes video macro block data to a buffer for use with a graphics engine (process block 322). In one embodiment, processing logic decrypts and renders the video data (process block 323).

Figure 4:
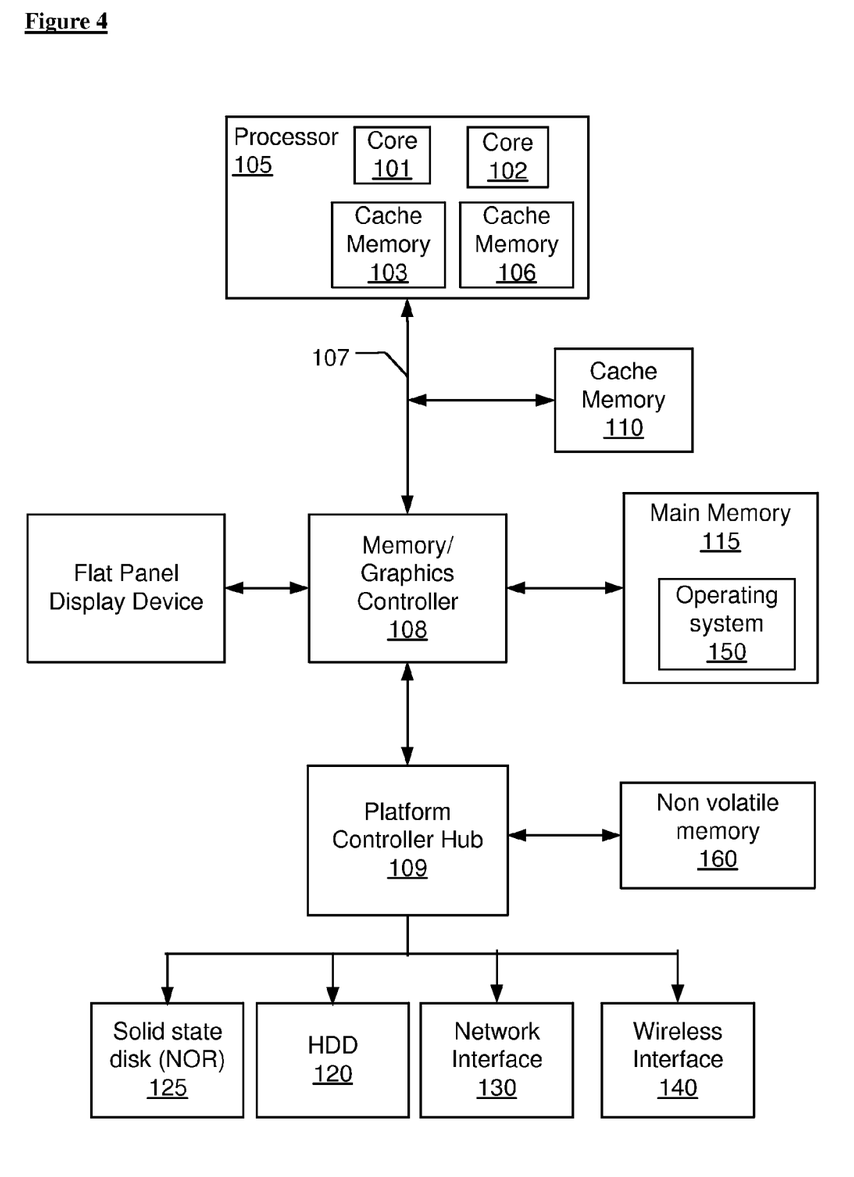
FIG. 4 illustrates a computer system for use with one embodiment of the present invention.

FIG. 4 is a block diagram illustrating a computer system in accordance with one embodiment of the present invention. In one embodiment, the computer system includes processor 105, memory/graphics controller 108, platform controller hub 109, main memory 115, and non-volatile memory 160. In one embodiment, processor 105 accesses data from level 1 (L1) cache memory 106, level 2 (L2) cache memory 110, and main memory 115. In one embodiment, processor 105 is coupled to memory/graphics controller 108. Memory/graphics controller 108 is coupled to platform controller hub 109, which in turn, coupled to non-volatile memory 160, solid state disk 125, hard disk drive 120, network interface 130, and wireless interface 140. In one embodiment, main memory 115 loads operating system 150.

In one embodiment, processor 105 comprises core 101, core 102, cache memory 103, and cache memory 106. In one embodiment, cache memory 103 is a private cache of core 101, whereas cache memory 106 is a private cache of core 102.

In one embodiment, main memory 115 may be implemented in various memory sources, such as dynamic random-access memory (DRAM), hard disk drive (HDD) 120, solid state disk 125 based on NVRAM technology, or a memory source located remotely from a computer system via network interface 130 or via wireless interface 140 containing various storage devices and technologies. The cache memory may be located either within the processor or in close proximity to the processor, such as on the processor's local bus 107.

In one embodiment, non-volatile memory 160 is a system read only memory (ROM) or a non-volatile memory device.

In one embodiment, platform controller hub 109 includes one or more encryption/decryption modules and video processing modules (not shown). In one embodiment, platform controller hub 109 is coupled to processor 105 with a single link (i.e., interconnect or bus). In one embodiment, this coupling may be accomplished over a series of links. In one embodiment, processor 105 is coupled over a first link (e.g., local bus 107) to memory/graphics controller 108 (where the memory complex interfaces with a memory subsystem), and memory/graphics controller 108 is coupled to platform controller hub 109 over a second link. In one embodiment, 110 interconnects are a combination of point-to-point interconnects and buses.

In many embodiments, at least one processor 105 is present. In one embodiment, multiple processor cores are present in the system (cores 101-102). In one embodiment, multiple processors, each with single or multi-cores are present in the system (not shown). In embodiments where there are multiple cores and/or multiple processors in the system, a single master core is designated to perform boot and other such system handling processes in the system.

In one embodiment, processor 105, cache memory 106, memory/graphics controller 108, and platform controller hub 109 are in a same package. In one embodiment, processor 105, cache memory 106, memory/graphics controller 108, and platform controller hub 109 are on a same substrate. In one embodiment, processor 105, cache memory 106, memory/graphics controller 108, and platform controller hub 109 are on a same substrate or in a same package.

Other embodiments of the invention, however, may exist in other circuits, logic units, or devices in conjunction with the system of FIG. 4. Furthermore, other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include but are not limited to processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. An apparatus comprising:
   a hardware digital rights management (DRM) platform coupled to receive DRM-encrypted audio/video content, the DRM platform comprising a key derivation module that is a cryptography engine with public-private keys functionality and is configured to set up session keys and to perform key derivations; and
   a decryption module coupled to receive digital rights management DRM-encrypted audio/video content, to decrypt the DRM-encrypted audio/video content using one or more keys from the key derivation module, the decryption module and the key derivation module to enable secure playback of media content by performing sensitive media processing comprising at least DRM key derivation and extracting a title key using hardware and to decrypt, wherein the title key is opaque to media player applications and only accessible to processing hardware;
   an encryption module coupled with the decryption module to write an encrypted version of the video data to a video buffer of a graphics engine;
   the graphics engine coupled to receive the encrypted video data from the hardware DRM platform to decrypt the video data, to decode processing on the video data before the data are ready for display;
   a header parser to scan a data buffer to determine packet boundaries of the first data and to identify instructions to parse for determining boundaries between sensitive and less-sensitive data;
   a bit parser to perform parsing on the first data to determine offsets of sensitive and less-sensitive data; and
   an application communicatively coupled with the hardware DRM platform to utilize navigation data, audio non-protected data and video non-protected data.

2. The apparatus of claim 1, wherein the controller is operable to provide a content decryption key securely to a graphics engine and an audio engine if video data portions and audio data portions in the first data are identifiable without having to decrypt the first data.

3. The apparatus of claim 1, further comprising:
a first encryption module to encrypt video data by using a second key that is shared with a playback application; and
a second encryption module to encrypt video information by using a third key, wherein the video data are sensitive data and the video information is less sensitive than the video data.

4. The apparatus of claim 3, wherein the graphics engine is operable to decrypt the encrypted video data by using the second key and to process the video data for displaying.

5. The apparatus of claim 3, wherein the first key is a DRM (digital rights management) device key, wherein the controller is operable to share the second key with the graphics engine and to share the third key with an application to decrypt an encrypted version of the video information.

6. The apparatus of claim 1, wherein an encrypted version of the video information comprising audio data and video headers is to be decrypted by an application, wherein an unencrypted version of the video data is protected from the application and the first key is opaque to the application.

7. The apparatus of claim 1, wherein a protection level of the first part of the first data is higher level than that of a second part of the first data.

8. The apparatus of claim 1, wherein the video information comprises data to determine a beginning of a video slice data and a length of the video slice data.

9. A method comprising:
receiving, from a first application with a key derivation module of a hardware digital rights management (DRM) platform, authentication information including a first key associated with DRM-encrypted audio/video content, to decrypt a first part of first data in conjunction with a first key;
setting up session keys and to performing key derivations with a hardware digital rights management (DRM) platform coupled to receive DRM-encrypted audio/video content, the DRM platform comprising at least a key derivation module that is a cryptography engine with public-private keys functionality and is configured to;
performing sensitive media processing comprising at least DRM key derivation and extracting a title key using hardware and the first key with the hardware DRM platform, wherein the first key is opaque to media player applications and only accessible to the hardware DRM platform;
decrypting a first part of first data with a DRM decryption module of the hardware DRM platform to generate video information and video data;
encrypting at least a protected video portion of the video data;
storing the encrypted protected video portion in a graphics engine having a decryption module;
scanning a data buffer with a header parser to determine packet boundaries of the first data and to identify instructions to parse for determining boundaries between sensitive and less-sensitive data;
performing parsing on the first data with a bit parser to determine offsets of sensitive and less-sensitive data;
decrypting and enabling secure playback of the media content by performing less sensitive data processing using a tamper resistant software (TRS) mechanism; and
causing the video information and video data to be stored for playback.

10. The method of claim 9, further comprising separating the first data into a first part and a second part, wherein a protection level of the first part of the first data is higher level than that of a second part of the first data.

11. The method of claim 9, further comprising:
encrypting the video data by using a second key;
encrypting the video information by using a third key; and
generating an encrypted version of the video data to be stored to a video buffer of a graphics engine, wherein the video data are sensitive data and the video information is less sensitive than the video data.

12. The method of claim 11, further comprising:
decrypting the encrypted version of video data by using the second key; and
decoding the video data for displaying.

13. The method of claim 11, further comprising decrypting, by the first application, an encrypted version of the video information comprising audio data and video headers.

14. The method of claim 11, further comprising:
sharing the second key with the graphics engine; and
sharing the third key with the first application to decrypt an encrypted version of the video information, wherein the first key is a DRM key.

15. An article of manufacture comprising a non-transitory computer readable storage medium including data storing instructions thereon that, when accessed by a machine, cause the machine to perform a method comprising:
receiving, from a first application with a key derivation module of a hardware digital rights management (DRM) platform, authentication information including a first key associated with DRM-encrypted audio/video content, to decrypt a first part of first data in conjunction with a first key;
setting up session keys and to performing key derivations with a hardware digital rights management (DRM) platform coupled to receive DRM-encrypted audio/video content, the DRM platform comprising at least a key derivation module that is a cryptography engine with public-private keys functionality and is configured to;
performing sensitive media processing comprising at least DRM key derivation and extracting a title key using hardware and the first key with the hardware DRM platform, wherein the first key is opaque to media player applications and only accessible to the hardware DRM platform;
decrypting a first part of first data with a DRM decryption module of the hardware DRM platform to generate video information and video data;
encrypting at least a protected video portion of the video data;
storing the encrypted protected video portion in a graphics engine having a decryption module;
scanning a data buffer with a header parser to determine packet boundaries of the first data and to identify instructions to parse for determining boundaries between sensitive and less-sensitive data;
performing parsing on the first data with a bit parser to determine offsets of sensitive and less-sensitive data;
decrypting and enabling secure playback of the media content by performing less sensitive data processing using a tamper resistant software (TRS) mechanism; and
causing the video information and video data to be stored for playback.

16. The article of manufacture of claim 15, wherein the method further comprising separating the first data into a first part and a second part, wherein a protection level of the first part of the first data is higher level than that of a second part of the first data.

17. The article of manufacture of claim 15, wherein the method further comprising:
- encrypting the video data by using a second key;
- encrypting the video information by using a third key; and
- generating an encrypted version of the video data to be stored to a video buffer.

18. The article of manufacture of claim 17, further comprising:
- decrypting the encrypted version of video data by using the second key; and
- decoding the video data for displaying.

19. The article of manufacture of claim 17, further comprising decrypting, by the first application, an encrypted version of the video information comprising audio data and video headers.

* * * * *